United States Patent
Firth et al.

(10) Patent No.: US 6,480,650 B2
(45) Date of Patent: Nov. 12, 2002

(54) FIBRE TERMINATION COMPOUND GRADED INDEX LENSES

(75) Inventors: Paul A Firth, Stoke Gabriel (GB); Adrian Janssen, Exeter (GB)

(73) Assignee: Nortel Networks Limited, St. Laurent (CA)

(*) Notice: Subject to any disclaimer, the term of this patent is extended or adjusted under 35 U.S.C. 154(b) by 167 days.

(21) Appl. No.: 09/750,874

(22) Filed: Dec. 28, 2000

(65) Prior Publication Data

US 2001/0005440 A1 Jun. 28, 2001

Related U.S. Application Data

(63) Continuation-in-part of application No. 09/345,070, filed on Jun. 30, 1999.

(51) Int. Cl.[7] ................................................ G02B 6/32
(52) U.S. Cl. ............................ 385/34; 385/33; 385/93; 359/652
(58) Field of Search ................................ 385/31–35, 88, 385/93; 359/652, 654

(56) References Cited

U.S. PATENT DOCUMENTS

| 5,774,607 A | * | 6/1998 | Shiraishi et al. ............... 385/33 |
| 5,815,614 A | * | 9/1998 | Pan .............................. 385/22 |
| 6,014,483 A | * | 1/2000 | Thual et al. ................... 385/33 |
| 6,034,825 A | * | 3/2000 | Konishi ....................... 359/654 |

* cited by examiner

*Primary Examiner*—Hemang Sanghvi
(74) *Attorney, Agent, or Firm*—Lee, Mann, Smith, McWilliams, Sweeney & Ohlson

(57) ABSTRACT

It is known to couple a collimated beam of light into the end of an optical fibre with a graded index lens having an angled facet at the lens/fibre interface to reduce the amplitude of Fresnel retroreflected power. The expense incurred in providing angled facets is avoided by using a two-part compound lens. One part is a graded index lens part having an axial length shorter than a quarter period. To this is bonded a cylindrical uniform refractive index lens part whose index is matched with the effective refractive index of the fibre. This reduces the amplitude of the retroreflection power by causing the displacement of the Fresnel reflection from the lens focus.

12 Claims, 2 Drawing Sheets

FIBRE TERMINATION COMPOUND GRADED INDEX LENSES

RELATED APPLICATION

This application is a continuation-in-part of co-pending U.S. patent application No. 09/345,070, filed Jun. 30, 1999.

FIELD OF THE INVENTION

This invention relates to graded index lenses, and in particular to their use as optical fibre waveguide terminations.

BACKGROUND TO THE INVENTION

FIG. 1 schematically depicts a graded index lens 10 of quarter period length, s, this; lens having a squared-off entrance facet 11 (ie. a facet perpendicular to the lens axis). Accordingly a collimated light beam 12 incident axially upon the entrance facet is brought to a focus at a plane 13 distant a behind the entrance facet 12, is reconstituted as a collimated beam at a plane 14 distant $2s$ behind entrance facet 12, and so on. Traces 15 schematically depict the cyclic progression between focussing and collimation.

In principle therefore, as depicted in FIG. 2, a collimated beam of light 12 can be focussed on to the end of an optical fibre 23 using a quarterperiod length (s) graded index lens 20 having entrance and exit facets 21 and 22 that are perpendicular both to the lens axis and to the incident light. To provide an adequately robust union between the fibre and the lens, the end portion of the fibre may be secured within the bore of a ferrule 24 (indicated in broken outline), typically a ceramic ferrule, and then the lens is secured to the fibre with adhesive applied between the abutting surfaces of the ferrule and the lens. The fibre 23 has an optical core of material having a bulk refractive index that is a predetermined amount greater than that of the optical cladding material with which that core is surrounded. Not all of the energy of a guided mode of such a fibre is contained within the core, and so that guided mode propagates with a velocity that Is increased in comparison with that with which light of the same wavelength will propagate through an unconfined volume of the core glass material. Accordingly the guided mode experiences an effective refractive index that is somewhat less than that of the core glass material, the amount by which it is less being determined by the extent to which the energy in the guided mode extends beyond the physical confines of the core. Typically the effective refractive index of the guided mode of the fibre 23 is not well matched with the pertinent refractive index of the graded index lens 20, and so Fresnel reflection will generally occur at the lens.fibre interface. For such reflection, the virtual image of the entrance facet is formed in a plane 25 lying a distance s behind the exit facet 22. This virtual image is therefore distant 28 from the entrance facet 21. Accordingly the Fresnel reflected light emerges after having propagated an axial distance $2s$ through the Ions 20. It therefore emerges as a collimated beam propagating axially in the direction directly opposite that with which the light was originally incident upon the lens. (The virtual rays are depicted by broken lines 26.) In a number of applications such retro-reflection Is undesirable or intolerable.

A known way of overcoming this retro-reflection problem is to angle the Interface between the fibre and lens as depicted in FIG. 3. In this instance the collimated beam of light 12 is Incident axially upon a graded index lens 20' whose entrance facet 21' is perpendicular to the lens axis, but whose exit facet 22' is Inclined at an oblique angle to that axis. The end of the fibre 23', and also of the surrounding ferrule 24', if present, is inclined at an oblique angle to its aids. The lens 20' is a quarter-period (s) long along its axis, and so the incident light is brought to a focus by the lens at the end of the fibre. If desired, the oblique angle on the end of the fibre (and its ferrule, if present) may be chosen to differ from that of the exit facet of the lens by the small amount necessary to take account of refraction at this interface. As the result of this use of a graded index lens with an obliquely oriented exit facet, any Fresnel reflection occurring at this facet is directed off-axis, and so emerges at an angle to the Incident light to be incident at a position where it can be arranged that it will do no harm.

A disadvantage of this approach to the problem of Fresnel reflection is that the preparation of angled end facets, both on the graded Index lens and on the fibre and its ferrule, adds significantly to the cost of the manufacture of a graded index lens terminated optical fibre, in some circumstances more than doubling the lost.

SUMMARY OF THE INVENTION

An object of the present invention is, in respect of the launching of a beam of collimated light into the -end of an optical fibre via a graded index lens, to reduce, without recourse to the use of angled facets on that graded index lens. the intensity of Fresnel reflected light directed back along the path of the incident light According to a first aspect of the present invention, there is provided a two part compound lens consisting of a plane-parallel ended first lens part united in end-to-end relationship with a plane-parallel ended second lens part, the compound lens having a lens axis which is co-directional with the normal to both ends of the lens parts, wherein the first lens part is a graded index lens of length $d_1$ and quarter period s, and the second lens part is of uniform refractive index and of length $d_2$, wherein $d_1=(2n-1)s-\Delta$, where n is a positive integer and $s>\Delta>0$, $\Delta$ is a length of the first lens which is removed and substituted by the second lens part of length $d_2$, $d_2$ is a length possessing the property that collimated light incident axially upon that end face of the graded Index first lens part that is remote from the end facet united with the second lens part, is brought to a substantial focus at that end facet of the second lens part that is remote from the end facet united with the first lens part.

It is, however, not always necessary or desirable to provide the second lens part with parallel end facets. In certain applications there can be advantage in providing this second lens part with planar end facets that are deliberately chosen to define a small wedge angle that makes the thickness of this lens part slightly greater than $d_2$ at one side edge thereof, and slightly greater than $d_2$ at the opposite side According to a first aspect of the present invention, there is provided a two-part compound lens consisting of a plane-parallel ended first lens par and a planar ended second lens part united in end-toend relationship, wherein the first lens part of the compound lens has a lens axis normal to its ends and is a graded index lens of quarter period s length and of length $d_1$, where $d_1=(2n-1)s\cdot\Delta$, and where n is a positive integer and $s>\Delta>0$, $\Delta$ is a length of the first lens which is removed and substituted by the second lens part of length $d_2$ and wherein the planar ends of the second lens part of the compound lens are inclined at a small wedge angle, and are chosen to provide a lens part thickness of less than $d_2$ at one side of the second lens part, and of greater than $d_2$ at the other, where $d_2$ is a length possessing the property that collimated light incident axially upon the end face of the graded Index first lens part that is remote from the end facet united with the second lens part, is brought to a substantial focus at a depth $d_2$ into the material of the second lens part.

The invention also resides in an optical fibre terminated with a two part compound lens as set out In the three preceding paragraphs, wherein one end of the fibre abuts the second lens part of the compound lens, and has a core providing a guided mode of that fibre with an effective refractive index substantially matched with the refractive index of the second lens part of the compound lens.

It should be understood that the replacement of a simple graded index lens with a compound lens whose graded part has the same refractive index profile as that the simple graded index lens, and whose uniform refractive index part has its refractive index matched with the effective refractive index of the fibre, does not result in any reduction of the Fresnel reflection coefficient. Accordingly, the total reflected power, expressed as a proportion of the Incident power, is the same in both instances. However the plane in which the power Is reflected Is different in the two instances. The improved performance of the compound lens is therefore seen not to result from a reduction in reflected power, but from altering the position of the plane of reflection as to change the angular spread of that reflection so that less power is reflected back directly along the path of the incident light.

Other features and advantages of the invention will be readily apparent from the following (description of a preferred embodiment of the invention, from the drawings and from the claims.

DETAILED DESCRIPTION OF A PREFERRED EMBODIMENT

Figure 4:
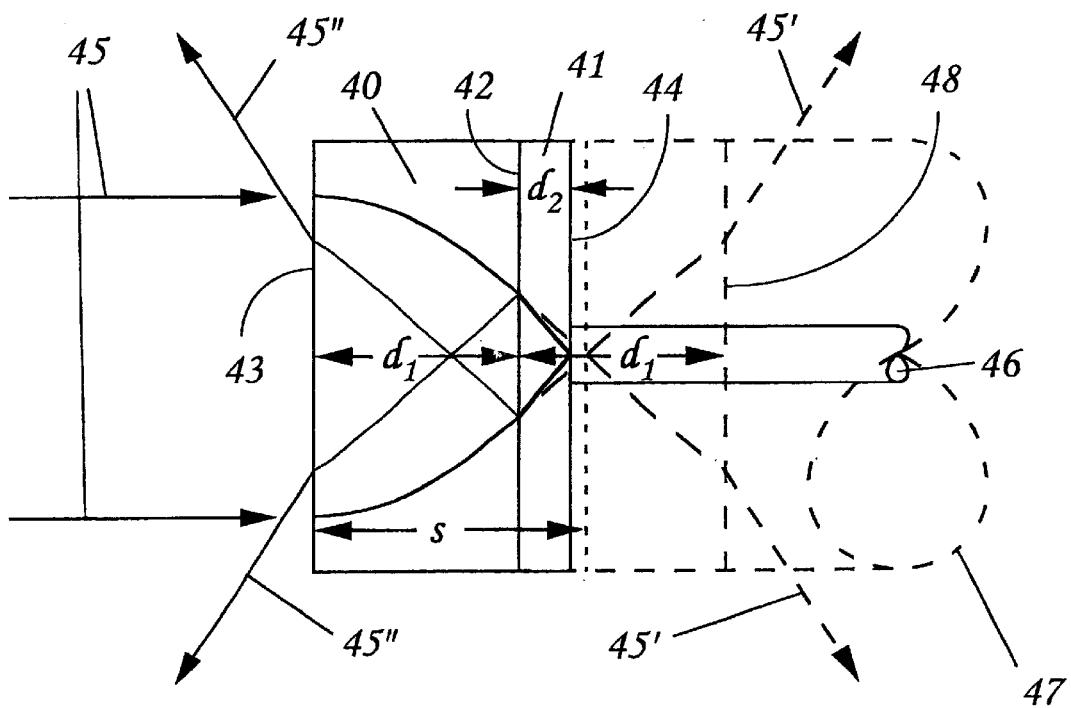
FIG. 4 is a schematic diagram of an optical fibre terminated with a two-part compound graded index lens embodying the invention in a preferred form.

Referring to FIG. 4, a two-part compound lens embodying the present invention in a preferred form comprises a first lens part 40, which is a cylindrical graded Index lens part, and a second lens part 41 which is also cylindrical, but of uniform refractive index. Both lens parts have planar parallel end facets to which the axis of the first lens part is a normal. One end facet of the first lens part 40 is in abutment with, and united to, one end facet of the second lens part, thereby defining a common facet 42. The other end facet of each of the two lens parts, facets 43 and 44, respectively constitute entrance and exit facets of the compound lens for light 45 incident normally upon facet 41 of the graded index lens part 40. Abutting facet 44 is one end of an optical fibre 46 disposed with its axis aligned with that of the graded index lens part 40. Typically, but not necessarily, the fibre is secured with adhesive to tile compound lens. To provide an adequately robust adhesion between the fibre and the lens, the end portion of the fibre may be secured within the bore of a ferrule 47 (indicated in broken outline), typically a ceramic ferrule, and ten the lens is secured to the fibre with adhesive applied between the abutting surfaces of the lens and the ferrule, together with the end of the fibre encircled by it. Typically, but not necessarily, the fibre 46 is a single mode fibre.

The graded index lens part 40 has an axial length di which is shorter than its quarter period length s. This insures that the beam 45 of collimated light incident upon facet 43 emerges from the graded index lens part by way of common facet 42 as an unfocussed convergent beam. (Owing to the cyclic nature of the focussing that occurs in graded index lenses, the length $d_1$ of the graded index lens part can, at least in principle, be augmented by any integral number of even multiples of quarter period s, and produce the same format of convergent beam. Generally however, for practical reasons, it will be preferred riot to augment the length in this way.)

The uniform refractive index lens part 41 has an axial length $d_2$, which is the length necessary to locate the focus of the light beam 45 emerging from the common facet 42 substantially in the plane of the exit facet 44, i.e. at the end of the core of the fibre 46. The value of the refractive index of the uniform refractive index lens part is chosen to be a substantial match with the effective refractive index of the guided mode of the fibre 46. Generally, the value of the effective refractive index is less than that on and near the axis of the graded in index lens part 40, and so the aggregate length of the compound lens is less than the quarter period of the graded index lens part, i.e. $d_1+d_2<s$.

The matching of the refractive index of lens part 41 with the effective refractive index of the fibre 46 is designed to suppress any Fresnel reflection at the lens/fibre interface 44. Consequent upon this, there is a refractive index mismatch at the interface 42 between the two parts of the compound lens, and this mismatch will give rise to Fresnel reflection at this latter interface. For such reflection, the virtual image of the entrance facet is formed in a plane 48 lying a distance $d_1$ behind the common interface 42. This virtual Image Is therefore distant $2d_1$ from the entrance facet 43. The virtual rays of this reflection are depicted by the broken lines 45' which, due to the index grading, are curved as far as the image plane 48, suffer a discrete refraction at this image plane, and are rectilinear thereafter. The actual reflected rays are depicted by thin unbroken lines 45". When it re-emerges from the compound lens, because the reflected light has propagated an axial distance of only $2d_1$ in the graded index medium, instead of $2s$, this reflected light is emergent not as a collimated beam propagating axially in the direction directly opposite that with which the light was originally incident upon the compound lens, but as a significantly divergent one.

In the case of the ray optics situation depicted in FIG. 4, since the incident light beam 45 is collimated, whereas the reflected light beam 45' is divergent, the proportion of the reflected light beam 45" that is captured by the optical system responsible for launching the incident light beam 45 is dependent upon the particular geometry of that optical system. Any such system will have an effective field stop whose size and distance from the compound lens will determine just how much of the reflected light is captured by the system. To avoid having this feature in the calculation of the performance of the compound lens in suppressing unwanted reflection, recourse may be had to analysing the situation in terms of Gaussian optics and using the concept of overlap integrals to evaluate coupling coefficients between the incident and reflected light Such evaluation will represent the 'worst case' situation, and the effects of field stops will be to reduce still further the magnitude of the captured reflected power.

In terms of Gaussian optics, the incident light will exhibit a waist at the ray optics focus, find the beam expands in diameter with increasing distance from this waist in the same manner as a Gaussian beam emerging into an unguided medium from the end of a waveguide. The optical coupling between two such waveguides axially separated by an optical path length distance z, and having an angular misalignment $\phi$ and a lateral offset x, can be determined by evaluating in known manner the overlap integral between the two beams in terms of the parameters z, $\phi$ and x. Following from this, it can be seen that the same analysis can be applied to determine the worst case reflection coupling, where in this Instance the parameter z represents twice the optical path length distance between the waist (ray optics focal plane) and the reflecting facet.

Figure 1:
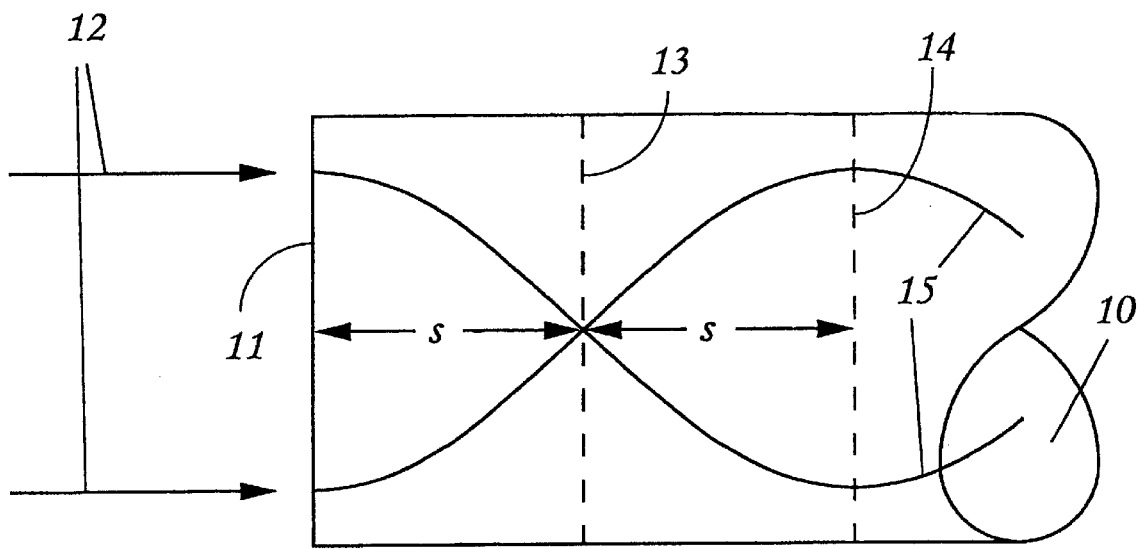
FIG. 1 is a schematic diagram of a graded index lens of indeterminate length.
Figure 2:
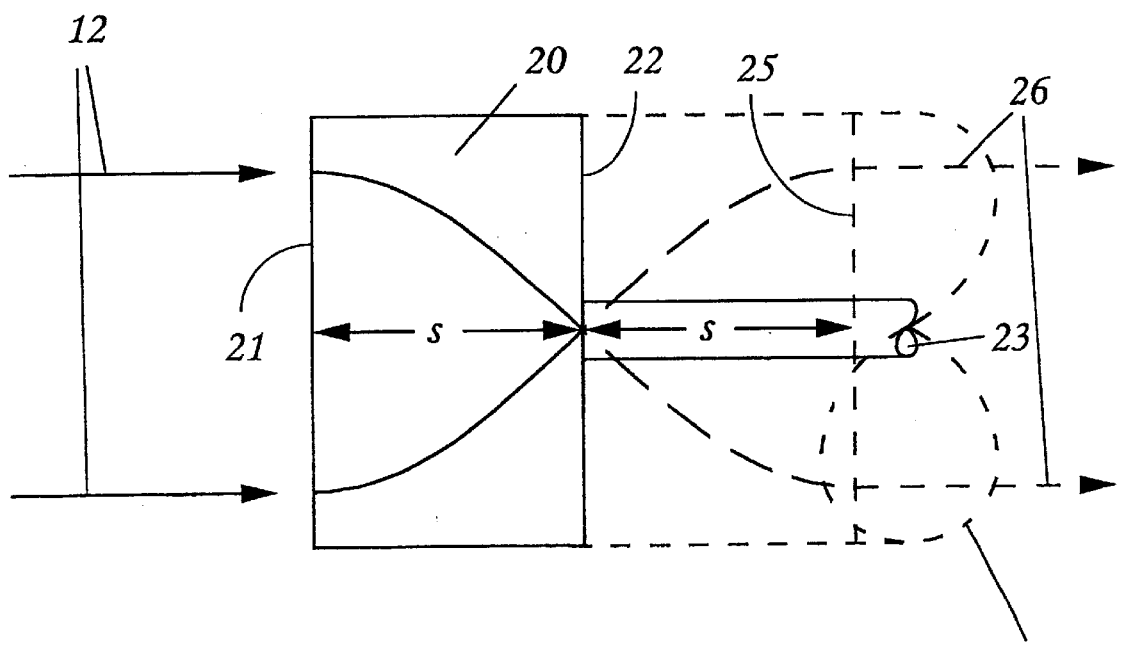
FIG. 2 is a schematic diagram of an optical fibre terminated with a prior art square-ended quarter-period simple graded index lens.

In the case of the configuration of FIG. 2, the values of the parameters z, $\phi$ and x are all zero, and so the coupling is 100%, the only attenuation of the reflected light arising from the factor by which the reflectivity is less than total, this factor being determined by the Fresnel relationship existing by virtue of the refractive index difference at the lens/fibre interface.

Figure 3:
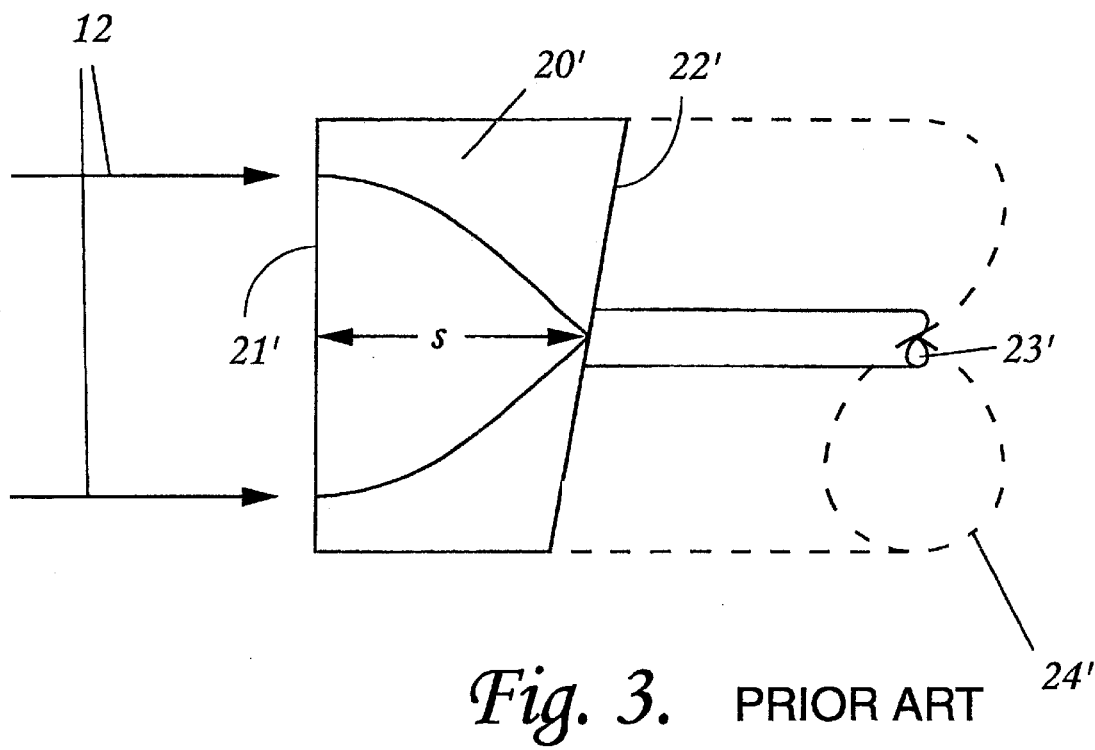
FIG. 3 is a schematic diagram of an optical fibre terminated with a prior art angle-facetted quarter-period simple graded index lens.

In the case of the configuration of FIG. 3, the values of the parameters z and x are both still zero, but the coupling is reduced by the fact that the angular offset f is non-zero, being twice the angle between the optical axis of the lens and tie normal to its rear facet 22'.

In the case of the configuration of FIG. 4, the values of the parameters $\phi$ and x are both zero, but the coupling is reduced by the fact that in this Instance the value of the parameter z is non-zero.

In the specific instance of a compound lens as depicted in FIG. 4, in which the graded index lens part had an axial length of 4.03 mm and a refractive index profile ranging between 1.59 and 1.52 over a diameter of 1.8 mm, while the uniform refractive index lens part had an axial length of 0.75 mm and a refractive index of 1.482, the worst case reflected power is calculated to be approximately −47 db.

Thus far in the specific description, attention has been directed to a compound lens in which both lens parts have plane parallel ends, It will be appreciated teat in these circumstances the efficient launching of a well-collimated beam of light 45 into the end of the optical fibre 46 imposes relatively tight tolerances in respect of the length and refractive indices of the two component parts of the compound lens. The meeting of such tolerances tends to put up the unit costs of these parts. However, it should be apparent that these tolerances can be somewhat relaxed, with a consequent saving in cost, if the compound lens is being used in an environment in which there is a convenient and easy to implement facility for making a small adjustment to the divergence of the incident beam 45. Such may for instance be the case when this beam 45 is the output from a ball lens (not shown) receiving light direct from the end facet of a diode laser (not shown). In these circumstances the geometry of the optical system may be such that the ball lens position can readily be adjusted to compensate for small errors in the parameters of the lens parts 40 and 41. In other circumstances there can be severe constraints upon the acceptable divergence of the beam 45 that will preclude the adoption of this approach. Such is liable to be the case in the instance of a wavelength multiplexer or demultiplexer that employs graded index lens terminated fibres in conjunction with a concatenation of dielectric filters in an expanded beam configuration (not shown). In these latter circumstances, the need for the maintenance of tight tolerances upon the parameters of the lens parts 40 and 41 can be relaxed by adopting a construction that is identical with that already described above with particular reference to FIG. 4, except that in this instance the facet 44 is Inclined at a small angle, typically about 1° to the facet 42. The graded index first lens part 40 is illuminated with the collimated light beam 45, and then, before the uniform index second lens part 41 is secured to it, the posit on of this second lens part 41 is laterally adjusted with respect to the first lens part 40 to find the relative position at which the Gaussian waist is located at the facet 44.

In the foregoing description with particular reference to FIG. 3 the incident light beam 12, has been described as being incident normally upon the entrance facet 21' of the lens 20'. In practice, however, it would be preferred to arrange for the light to be incident at a small non-zero angle of incidence so as to avoid deleterious Fresnel reflection effects in this facet in this context, it may be noted that whereas, in order to suppress deleterious Fresnel reflection effects in facet 22', it is necessary to angle this facet by about 6° or more; In the case of suppressing deleterious Fresnel reflection effects at the front facet 21' an angle of incidence at this front facet 21' of only about 1° is sufficient. The reason that t the smaller angle is sufficient in the case of the angle of Incidence is because this is at some distance from the Gaussian waist. A similar 1° angle of incidence will typically similarly be employed in the case of the compound lens of FIG. 4. Such a small angle as this will offset the centre of the Gaussian waist by only a very small amount from the lens axis, and will have virtually no effect upon the distance of this waist behind the front facet 43.

What is claimed is:

1. A two-part compound lens consisting of a plane-parallel ended first lens part united in end-to-end relationship with a plane-parallel ended second lens part, the compound lens having a lens axis which is co-directional with the normal to both ends of both lens parts, wherein the first lens part is a graded index lens of length $d_1$ and quarter period s, and the second lens part is of uniform refractive index and of length $d_2$, wherein $d_1=(2n-1)s-\Delta$, where n is a positive integer and $s>\Delta>0$, $\Delta$ is a length of the first lens which is removed and substituted by the second lens part of length $d_2$, $d_2$ is a length possessing the property that collimated light incident axially upon that end face of the graded index first lens part that is remote from the end facet united with the second lens part, is brought to a substantial focus at that end facet of the second lens part that is remote from the end facet united with the first lens part.

2. A compound lens as claimed in claim 1, wherein n=1.

3. An optical fibre terminated with a two-part compound lens as claimed in claim 1, wherein one end of the fibre abuts the second lens part of the compound lens, and has a core providing a guided mode of that fibre with an effective refractive index substantially matched with the refractive index of the second lens part of the compound lens.

4. A two-part lens terminated optical fibre as claimed in claim 3, wherein the optical fibre is a single mode fibre.

5. An optical fibre terminated with a two-part compound lens as claimed in claim 2, wherein one end of the fibre abuts the second lens part of the compound lens, and has a core providing a guided mode of that fibre with an effective refractive index substantially matched with the refractive index of the second lens part of the compound lens.

6. A two-part lens terminated optical fibre as claimed in claim 5, wherein the optical fibre is a single mode fibre.

7. A two-part compound lens consisting of a plane-parallel ended first lens part and a planar ended second lens part united in end-to-end relationship, wherein the first lens part of the compound lens has a lens axis normal to its ends and is a graded index lens of quarter period s length and of length $d_1$, where $d_1=(2n-1)s-\Delta$, and where n is a positive integer and $s>\Delta>0$, $\Delta$ is a length of the first lens which is removed and substituted by the second lens part of length $d_2$ and wherein the planar ends of the second lens part of the compound lens are inclined at a small wedge angle, and are chosen to provide a lens part thickness of less than $d_2$ at one side of the second lens part, and of greater than $d_2$ at the other, where $d_2$ is a length possessing the property that collimated light Incident axially upon the end face of the graded index first lens part that is remote from the end facet united with the second lens part, is brought to a substantial focus at a depth $d_2$ into the material of the second lens part.

8. A compound lens as claimed in claim 1, wherein n=1.

9. An optical fibre terminated with a two-part compound lens as claimed in claim 7, wherein one end of the fibre abuts the second lens part of the compound lens, and has a core providing a guided mode of that fibre with an effective refractive index substantially matched with the refractive index of the second lens part of the compound lens.

10. A two-part lens terminated optical fibre as claimed in claim 9, wherein the optical fibre is a single mode fibre.

11. An optical fibre terminated with a two-part compound lens as claimed in claim 8, wherein one end of the fibre abuts the second lens part of the compound lens, and has a core providing a guided mode of that fibre with an effective refractive index substantially matched with the refractive index of the second lens part of the compound lens.

12. A two-part lens terminated optical fibre as claimed in claim 11, wherein the optical fibre is a single mode fibre.

* * * * *